Patented Mar. 6, 1951

2,544,245

UNITED STATES PATENT OFFICE 2,544,245

METHOD FOR PREPARING DICYCLOHEXYL-AMMONIUM NITRITE

Aaron Wachter, Oakland, and Nathan Stillman, Berkeley, Calif., assignors to Shell Development Company, San Francisco, Calif., a corporation of Delaware No Drawing. Application September 6, 1949, Serial No. 114,276

5 Claims. (Cl. 260—563)

1

This invention relates to an improved method for preparing dicyclohexylammonium nitrite. Stated in its simplest terms, the novel method is one whereby dicyclohexylamine is reacted with phosphoric acid and a nitrite. The application is a continuation-in-part of copending application Serial No. 782,047, filed October 24, 1947.

Dicyclohexylammonium nitrite, a compound which is described in U. S. Patent No. 2,449,962, issued September 21, 1948, is a very useful corrosion inhibitor and may be employed for this purpose when in either the vapor phase or in solution. Heretofore dicyclohexylammonium nitrite has been prepared from dicyclohexylamine by forming a solution of a salt of the amine with sulfuric or hydrochloric acid, and thereafter adding to the solution an alkali metal nitrite whereby, through metathesis, there is precipitated the relatively insoluble dicyclohexylammonium nitrite. However, procedures involving the use of sulfuric or hydrochloric acids have been found to be not entirely satisfactory in a number of particulars. For one thing, the dicyclohexylamine salts formed with these acids are soluble to the extent of but 5 or 10% in aqueous solution at room temperatures, whereas, from the standpoint of efficient commercial operation, it would be desirable to have this solubility factor increased to a value of at least 20%. Accordingly, while the solubility of the amine sulfate or chloride may be somewhat increased by heating the solution to temperatures of from about 75 to 100° C., the solution must then be cooled to room temperatures in order to obtain a good yield of dicyclohexylammonium nitrite. Obviously, such a treatment is much more expensive than one conducted entirely at ambient temperatures. Another disadvantage of the prior art processes is that the dicyclohexylammonium nitrite obtained from the amine sulfate or chloride salts may contain substantial amounts of sulfate or chloride ions unless subjected to repeated washing procedures, and such ions naturally impair the utility of dicyclohexylammonium nitrite as a corrosion inhibitor for some applications.

It is, therefore, an object of this invention to provide a more efficient method for preparing dicyclohexylammonium nitrite. Another object is to provide a method of this character whereby any inorganic acid ions which may be present in the final product are in no wise detrimental from the corrosion or pH standpoints. The nature of still other objects of the invention will be apparent from the following description.

It is our discovery that a dicyclohexylammonium nitrite product having the desired characteristics may be produced in a highly efficient manner by reacting dicyclohexylamine with phosphoric (orthophosphoric) acid in water or other inert polar solvent whereby there is formed the relatively highly soluble salt of the amine with phosphoric acid, and then precipitating dicyclohexylammonium nitrite from said solution by the addition of a salt of nitrous acid and a base. Suitable nitrite salts for this purpose are, for example, alkali metal nitrites such as sodium, potassium or lithium nitrite, as well as ammonium nitrite. The salt of dicyclohexylamine with phosphoric acid [bis-(dicyclohexylamine) - monohydrogenphosphate], which is formed as an intermediate in the process of this reaction, is soluble in aqueous solution to the extent of at least 40% by weight at room temperatures (ca. 20° C.) from which it will be seen that the process may be conducted in an efficient manner, with high overall yields of the desired dicyclohexylammonium nitrite product for each cycle of operation. Further economy is achieved by virtue of the fact that there is no need to heat the solution or to cool the same in order to obtain a high product yield. While the dicyclohexylammonium nitrite obtained as a precipitate on addition of the nitrite may contain substantial quantities of phosphate (including acid phosphate) ions, this is in no wise a disadvantage but is actually beneficial, for such ions do not engender corrosion, as is the case with chloride and sulfate ions, but exert a buffering action having a tendency to maintain the pH of any solution formed from the product at a value of 8 or above. This is an advantage since the stability of the product, as well as its corrosion inhibitory properties, are thereby improved.

In carrying out the process of this invention, a solution is prepared (preferably using water as the solvent) containing dicyclohexylamine and phosphoric acid in the approximate mole ratio of one mole of acid to two moles of the amine, the preferred practice being to employ a slight excess of the amine (i. e. from about 2 to 10 mol per cent). To this solution is then added a water-soluble nitrite salt, as sodium or potassium nitrite, for example, in the ratio of about two moles of the salt for each mole of phosphoric acid employed. The dicyclohexylammonium nitrite precipitates out immediately on addition of the nitrite salt and may be recovered simply by filtering off the excess liquid present. Having in mind the foregoing limitations on the combining weights of the reactants, the concentration thereof may be adjusted in any desired manner. However, in the preferred practice of this invention, solutions are employed having overall solids concentrations of from about 25 to 40% by weight, the term "solids" here embracing all non-aqueous additives present in the solution. While solutions having a lower solids concentration than 25% may be employed, the efficiency of the operation is thereby impaired. Further, while solutions having a solids concentration in excess of 40% may also be used, the resulting slurry often becomes too heavy for convenient handling.

The crude dicyclohexylammonium nitrite recovered as a precipitate by a practice of the foregoing process may be used as a corrosion inhibitor in either the vapor state or in solution without any washing treatment whatsoever, for, as noted above, any remaining phosphate ions present therein are not harmful but, in fact, beneficial and the same may be said as regards any content of unreacted dicyclohexylamine or nitrite salt. However, if desired, the crude product may be subjected to one or more washing treatments, preferably with water, before being used.

The following examples are illustrative of the invention.

Example I

A solution having an overall solids concentration of 25% (and a theoretical content of 18.5% bis - (dicyclohexylammonium) - monohydrogenphosphate before precipitation of dicyclohexylammonium nitrite) was prepared by dissolving 2.1 moles of dicyclohexylamine and one mole of phosphoric acid in water at 20° C., and then adding 2 moles sodium nitrite with constant stirring. The addition of sodium nitrite caused the precipitation of dicyclohexylammonium nitrite, thereby converting the solution into a slurry from which the crude product was recovered by filtering and drying. The crude product obtained in this manner, which obtained 96% by weight dicyclohexylammonium nitrite (representing a yield of 90%), proved highly effective as a corrosion inhibitor when in solution as well as when in the vapor phase. It was entirely free of the corrosion problems engendered by using a product prepared in a similar manner, but using sulfuric or hydrochloric acids instead of phosphoric acid.

The crude dicyclohexylammonium nitrite obtained in the manner described above was then washed at room temperature with approximately twice its weight of water, and again filtered and dried. The washed product, which was recovered in yield of 95% was 99% pure, and its pH in 0.1% aqueous solution was 8.8. Again in contrast to dicyclohexylammonium nitrite of similar purity but prepared using sulfuric or hydrochloride acids instead of phosphoric acid, the product proved satisfactory in every particular as a corrosion inhibitor.

Example II

The process of the preceding example was repeated using solutions having solids concentrations of 30, 35, 40, 45 and 50%, respectively. In the case of the solution having a solids concentration of 30%, the yield of dicyclohexylammonium nitrite was 92%, whereas this figure was increased to 96% with the solution of 35% solids concentration, and to 99% with all the other solutions. In each case, the pH of a 0.1% aqueous solution of the respective washed, dicyclohexylammonium nitrite products was between 8.8 and 9.1. The products all proved to be entirely satisfactory from the corrosion and stability standpoints. It was noted, however, that the solutions of 45 and 50% solids concentrations yielded slurries which were too thick for convenient handling.

The various percentages employed herein are on a weight basis unless otherwise indicated.

The claimed invention is:

1. In a method of producing dicyclohexylammonium nitrite, the steps comprising adding dicyclohexylamine and phosphoric acid to a solvent medium, and adding to the resulting solution a salt of nitrous acid with a material selected from the group consisting of the alkali metals and ammonia.

2. The method of claim 1 wherein the amine is present in an excess of from about 2 to 10 mole percent.

3. The method of claim 1 wherein the solids concentration of the liquid is from about 25 to 40% by weight.

4. In a method of producing dicyclohexylammonium nitrite, the steps comprising adding dicyclohexylamine and phosphoric acid in the approximate amounts of 2 moles of the amine for each mole of acid to an aqueous solvent, and adding to the resulting solution approximately 2 moles of a salt selected from the group consisting of alkali metal nitrites and ammonium nitrite, for each mole of phosphoric acid employed.

5. The method of claim 4 wherein the solids concentration of the liquid is from about 25 to 40% by weight.

AARON WACHTER.
NATHAN STILLMAN.

REFERENCES CITED

The following references are of record in the file of this patent:

UNITED STATES PATENTS

| Number | Name | Date |
|---|---|---|
| 2,419,327 | Wachter et al. | Apr. 22, 1942 |
| 2,449,962 | Wachter et al. | Sept. 21, 1948 |